March 21, 1961     W. P. OEHLER ET AL     2,975,841
PLANTER MARKER MECHANISM
Filed Dec. 31, 1956     3 Sheets-Sheet 2
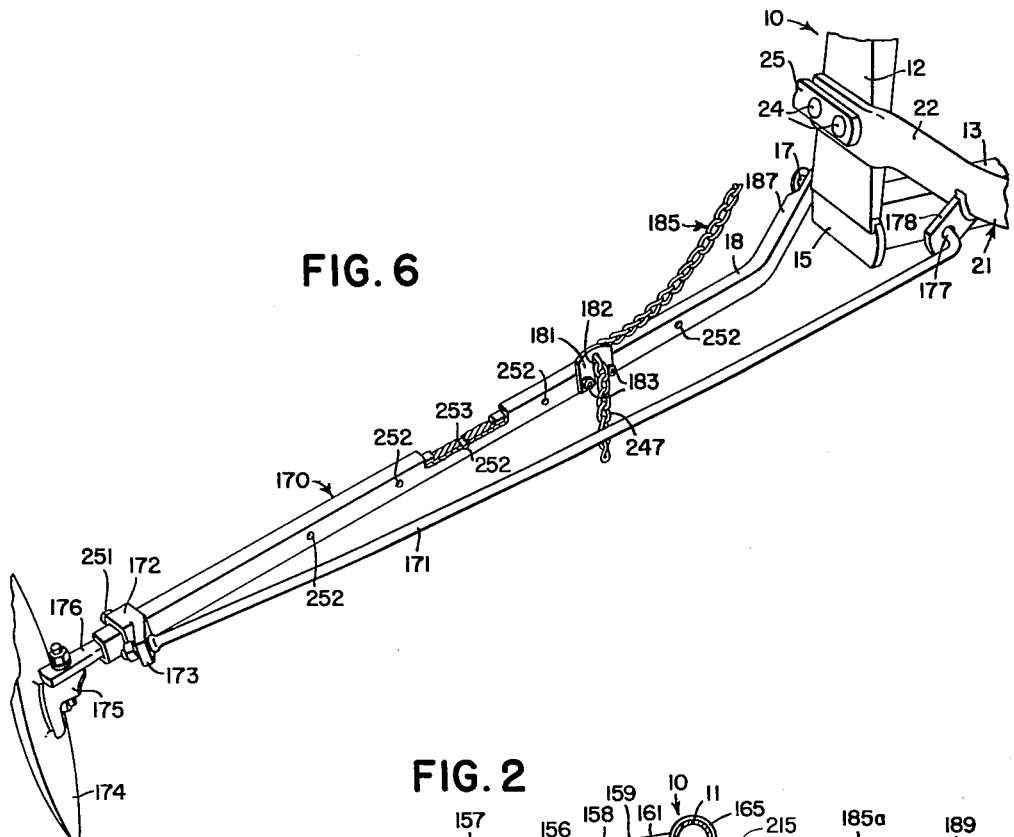
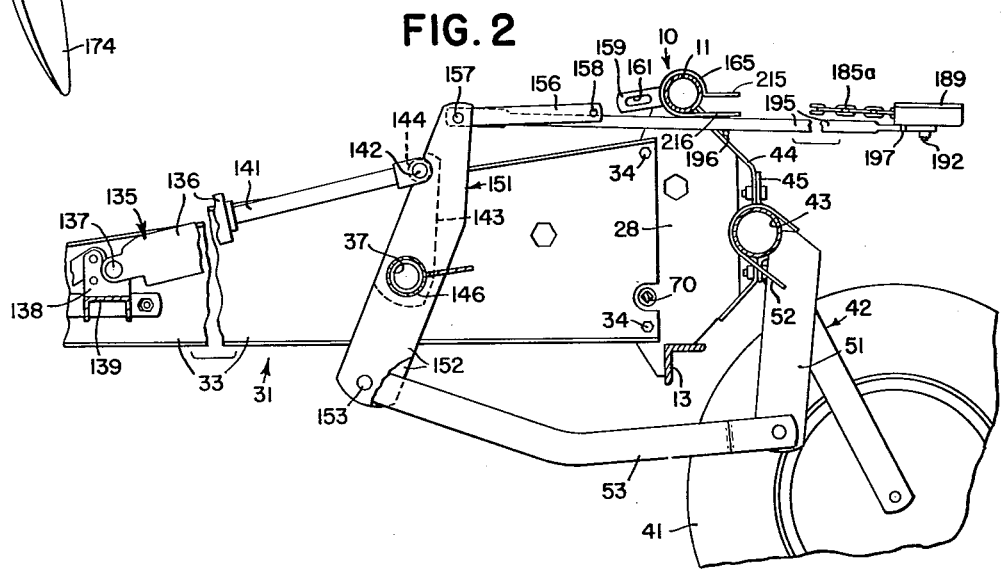
INVENTORS.
WILLIAM P. OEHLER
HAROLD V. HANSEN
BY
ATTORNEYS

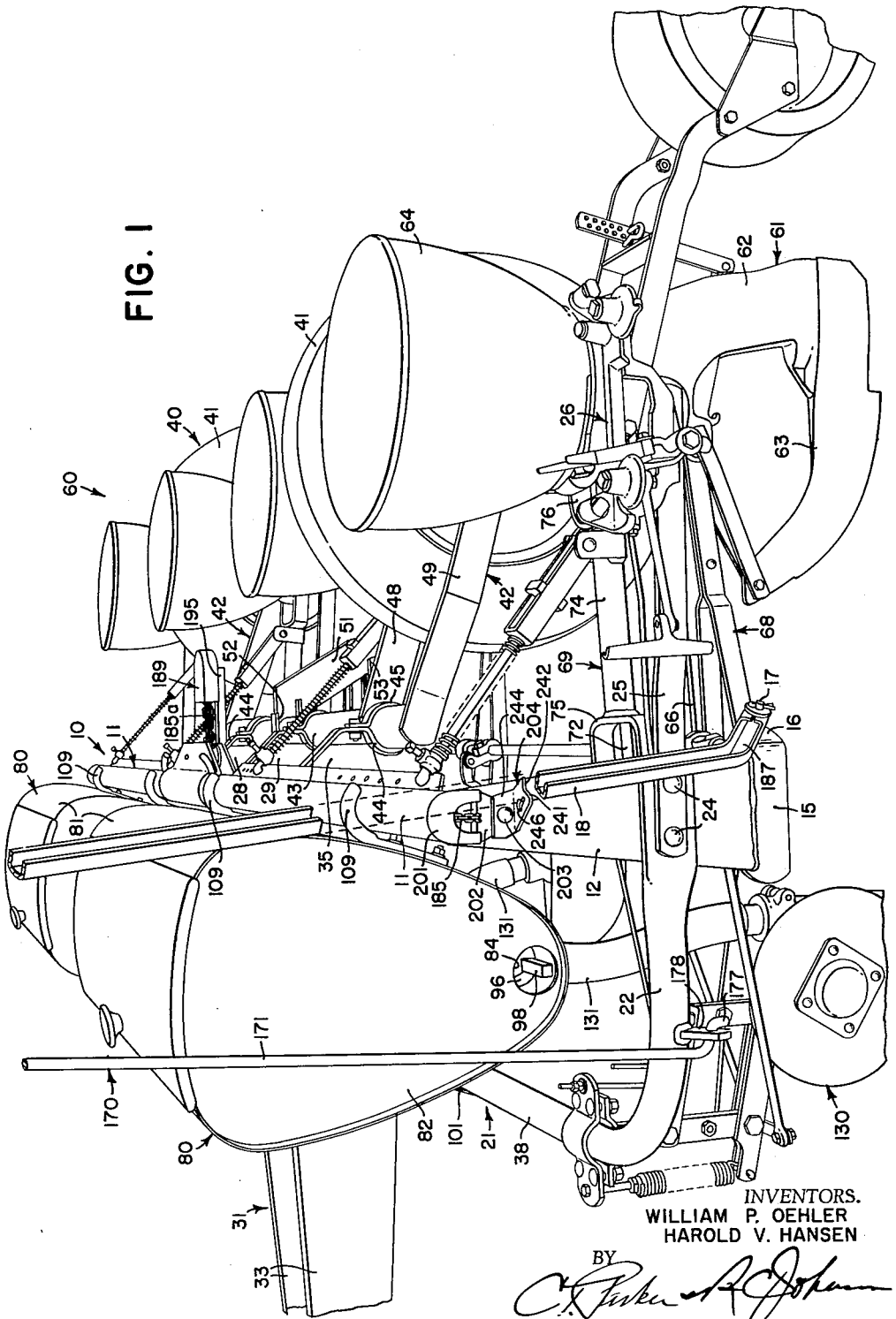

*INVENTORS.*
WILLIAM P. OEHLER
HAROLD V. HANSEN

United States Patent Office 2,975,841
Patented Mar. 21, 1961

2,975,841

PLANTER MARKER MECHANISM

William P. Oehler, Moline, and Harold V. Hansen, Hillsdale, Ill., assignors, by mesne assignments, to Deere & Company, a corporation of Delaware Filed Dec. 31, 1956, Ser. No. 631,587

16 Claims. (Cl. 172—128)

The present invention relates generally to agricultural implements and more particularly seeding implements, such as planters and the like.

The object and general nature of the present invention is the provision of a new and improved planter for row crops, such as a corn planter, for example. More specifically, it is a feature of this invention to provide a planting implement of this nature with new and improved marker mounting and controlling mechanism. Further, it is a feature of this invention to provide marker mechanism in which new and improved means have been incorporated for selectively lowering the desired marker arm into operating position.

Another feature of this invention is the provision of means, which may be mounted on the planter frame, for effectively restraining fore-and-aft oscillation of the marker arms when in their raised transport position.

These and other objects and advantages of the present invention will be apparent to those skilled in the art after a consideration of the following detailed description, taken in conjunction with the accompanying drawings, in which:

Fig. 1 is a perspective view of a four-row planting and fertilizer distributing implement in which the principles of the present invention have been incorporated.

Fig. 2 is a generally fore-and-aft extending vertical sectional view taken centrally through the planter, showing in particular the connection between the planter raising and lowering means and the marker operating means.

Fig. 6 is a fragmentary view showing one of the marker arms in its extended or operating position.

Figure 3:
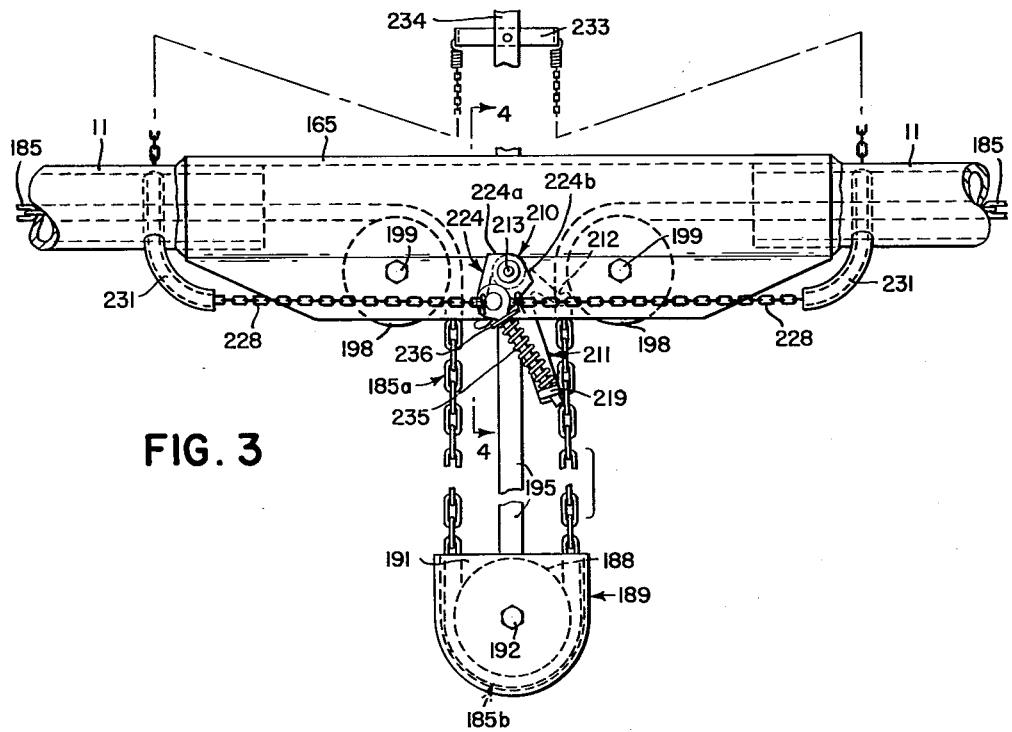
Fig. 3 is a fragmentary plan view of the planter lift actuated marker raising means.

The planter in which the principles of the present invention have been incorporated is shown in its entirety in Fig. 1 and comprises a main frame 10 that is made up of an upper sill bar, preferably in the form of a pipe, shown at 11, a pair of vertical end sections 12, generally triangular in configuration and secured in any suitable way, as by welding, at their upper ends to the ends of the upper sill pipe 11. The frame 10 also includes a lower transverse frame member 13, preferably in the form of an angle, that extends from one end to the other of the frame 10, each end being secured, as by welding, to the lower end of the associated end section 12 through a transverse part 15 that has one end 16 extended rearwardly and laterally inwardly, carrying a stud 17 that forms a bearing for the associated marker arm 18. The part 15 is also securely fixed, as by welding, to the lower or base portion of the associated end section 12. The main frame 10 also includes a front pipe member 21 having its ends bent rearwardly, as indicated at 22, and flattened so as to fit against the outer face of the associated end section 12. The flattened section is apertured to receive a pair of attaching bolts 24 that also extend through apertures in the associated end section 12, and the bolts 24 also pass through the forward portion of an associated check head support bar 25 which at its rear end carries a check head 26 that is conventional so far as the principles of the present invention are concerned, being constructed substantially like the check head shown in the U.S. Patent 2,315,752 which was issued April 6, 1943 to Charles H. White. Other vertical members, such as those indicated at 28 and 29, Fig. 1, cooperate with the end sections and rigidly secure the lower sill angle 13 to the upper sill pipe member 11 to form a rigid structure. The frame 10 further includes a draft frame section 31 that comprises a pair of forwardly extending generally vertically arranged plates 33, the rear ends of which are detachably secured in any suitable way, as by bolts 34, to the intermediate vertical frame sections 28 and 29. The frame 10 also includes other intermediate vertical frame sections 35, to provide the desired rigidity in the frame 10. Preferably, the intermediate vertical sections 28, 29 and 35 are shaped to fit against the lower frame angle 13 and are welded thereto. The forward pipe member 21 is made up of right and left hand sections 37 and 38, each having its laterally inner end suitably connected to the associated draft frame member 33.

The implement shown in Fig. 1 is in the nature of a towed planter, the forward ends (not shown) of the draft frame members 33 being connected by suitable hitch means with a farm tractor or other suitable propelling means. The main frame 10 is raised and lowered into and out of transport and operating positions by virtue of ground-engaging means 40 that includes a pair of ground wheels 41 carried on a pair of wheel arms 42 that are fixed at their upper and forward ends to a rockable shaft member 43, preferably in the form of a pipe, journaled in pairs of inner and outer bearing brackets 44 and associated bearing straps 45 suitably bolted together, the brackets 44 being secured, as by welding, to the associated vertical frame sections 28, 29 and 35. Each wheel arm 42 includes an inner member 48 and an outer member 49 receiving the associated wheel 41 therebetween and secured, as by welding, to the rockable pipe member 43, preferably with the outer bearing parts 44 and 45 disposed between the members 48 and 49.

An actuating arm 51 is securely fixed as by welding at its upper end to the generally central portion of the rockable pipe member 43, the connection being reenforced by a U-shaped strap 52 also welded to the arm 51 and to the pipe member 43, and the lower end of the arm 51 is apertured to receive a strap 53 or other suitable means forming a forwardly extending link connected or adapted to be connected to a suitable operating mechanism, such as a hydraulic cylinder, connected with and actuated by power derived from and normally operated by means on the tractor for controlling implements. By virtue of such means, a force is exerted against the arm 51 to swing the wheel frame 42, 43, thus raising and lowering the implement as a unit relative to the ground. The planter raising and lowering means is adapted, according to the present invention, to operate the marker arms, raising the latter, or at least whichever one of them is in a lowered position, whenever the planting units are raised. This means will be described below.

The implement shown in Fig. 1 is provided with both seeding means and fertilizing means. The seeding means is indicated in its entirety by the reference numeral 60 and comprises a plurality of planting units 61, each including a generally vertically disposed shank casting 62 carrying at its lower end a furrow opening runner 63 and at its upper end a seed hopper 64 and associated seed-selecting and dispensing mechanism (not shown), which may be of any suitable construction, preferably like that shown, for example, in the U.S. Patent 2,340,163, issued January 24, 1944 to Charles H. White. As shown in the latter patent, such a planting unit includes suitable valve means operated by a link 66 (Fig. 1) that extends forwardly generally in parallelism with respect to lower link means 68 and upper link means 69 that connect each shank casting 62 with the associated frame 10. Preferably, the forward ends of the link members 68 and 69 are connected to an associated generally vertically disposed bracket (not shown) fastened in any suitable way to the lower sill angle 13 of the frame 10. There is, of course, one bracket for each planting unit 61, and the construction generally is similar to that shown in U.S. Patent 2,376,464, issued May 22, 1945 to Charles H. White, and hence further description appears to be unnecessary. Suitable means, which does not form a part of the present invention, is provided to drive a drill shaft 70 (Fig. 2) and the latter is connected in any suitable way to actuate a seeding shaft 72 that extends rearwardly to the seed dispensing mechanism in each of the planting units 61. The upper link 69 is in the nature of a pipe 74 through which the associated seeding shaft 72 extends, with front and rear yokes 75 and 76 pivotally connected to the associated bracket that is mounted on the lower sill angle 13 and to the forward portion of the runner shank 62, respectively.

The fertilizer dispensing means incorporated in the planter of the present invention comprises a pair of transversely elongated fertilizer hoppers or containers 80. Each includes a hopper sheet 81 that is rolled to fit generally oval-like end plates 82. Distributing means in the form of an auger is disposed in the bottom of each hopper. The auger comprises a plurality of right and left hand auger sections 96, preferably in the form of castings, and a shaft 98 that is square in cross section and extends through correspondingly formed openings in the auger castings 96.

From Fig. 1 it will be noted that there are two planter units disposed substantially directly behind each elongated fertilizer hopper 80. Each hopper is supported for forward and downward swinging movement on the transverse portion of the front frame pipe member 21 by hinge means 101. Hook members 109 are fixed to the rear side of the hopper 80 and engage over the upper portion of the associated upper sill pipe 11 when the hopper is in its normal or vertical position, as shown in Fig. 1. As mentioned above, there are two hoppers 80 for the four planting units 60, and each hopper includes its own agitator and distributing means. The planting means 60 includes jackshaft means (not shown) that is driven in any suitable way from the ground wheels 41. The jackshaft drives various mechanisms of the implement, including the drill shaft 70 and the fertilizer distributing means 96, 98.

The implement 10 also includes two pairs of fertilizer furrow opening units 130, the details of which do not per se form any part of the present invention. It therefore suffices to note that fertilizer from the hopper 80 is delivered to the units 130 through a pair of flexible conduits 131 and that the upper end of each of the conduits 131 is releasably connected with the hoppers 80.

The wheel frame unit 40 is operated by power means indicated in its entirety by the reference numeral 135 (Fig. 2) and comprises a power cylinder 136 pivotally connected, as at 137, at one end to releasable bracket means 138 carried by a cross channel 139 that forms a part of the forward portion of the draft frame 31. The rear portion of the unit 136 takes the form of a piston 141 and this part is pivotally connected, as at 142, with a swingable arm 143 carrying a bushing 144 that is concentric with the pivot 142, receiving the latter, and is rigidly secured, as by welding, to the outer or upper end of the arm 143. The latter member is swingable on a pipe section 146 that extends from side to side between the plate members 33 of the draft frame 31, being mounted on the adjacent end portions of the pipe sections 37 and 38 that extend through openings in the draft frame plates 33 into the space between the latter. Secured to and forming a part of the pipe section 146 is a generally vertically extending lever 151 that comprises two bars 152 the lower ends of which are apertured to receive pivot means 153 by which the forward end of the actuating link 53 is connected with the power operating means 135. The arm 143 is swingable between the bars 152 but the bushing 144 is engageable with the forward edges of the upper portions of the bars 152, whereby when the unit 136 is extended, the lever 151 is power operated to exert a pull through the link 53 and thus rock the pipe member 43 of the wheel frame unit 40 in a clockwise direction as viewed in Fig. 2. This movement lowers the wheels 41 relative to the frame 10, and thus raises the latter and all parts mounted thereon into a transport position. A link 156 is pivoted at 157 to the upper end of the lever 151 and at its rear end carries a quick detachable pin 158 that is engageable with an apertured lug 159 that is fixed, as by welding, to the generally central portion of the frame 10. When the frame 10 is completely raised into a transport position, the end of the link 156 is disposable in alignment with a slot 161 in the lug 159, and then by inserting the pin 158, the wheel frame is locked in a transport position and the power unit 136 may be detached from the planter, if desired. The generally central portion of the frame 10 includes a U-shaped bracket 165 that, as best shown in Fig. 2, embraces the adjacent ends of the pipe members 11, and is securely fixed thereto as by welding. The apertured lug 159 is welded to the bracket 165.

According to the principles of the present invention, movement of the power unit 135, as in lowering the wheel frame unit 40 to raise the planter, is utilized to raise either or both of the marker arms, each referred to briefly above as including the channel 18, into a raised position. Referring now again to Fig. 1 and Fig. 6, each marker unit, there being one at each side of the planter, is indicated in its entirety by the reference numeral 170 and includes, in addition to the main arm 18, preferably formed of rigid channel-like stock, a rod 171. At its outer end, each channel member 18 carries a collar 172 having a lug 173 to which the outer end of the tension rod member 171 is fixed. The marker itself is in the form of a disk 174 adjustably fixed, as by bracket means 175, to a bar 176 that is telescopically received and carried by the channel 18, preferably between the flanges of the latter. As mentioned above, the channel member 18 is pivotally mounted on the stud 17, as can be seen in Fig. 1. The inner end of each rod or tension member 171 is formed with a hook section 177 and pivotally connected with an apertured lug 178 that is fixed to the rearwardly extending end 22 of the associated frame member 38. The parts 16, 17 and 178 are arranged so that the stud 17 and the apertured portion of the lug 178 establish a generally fore-and-aft extending pivot axis for the associated marker arm unit 170. Each marker arm unit 170 may be swung downwardly into operating position, as shown in Fig. 6, or upwardly into a transport or inoperative position, as indicated fragmentarily in Fig. 1. In operation, usually only one marker is lowered, the other being held in a raised or inoperative position. The means for raising the marker arms, and controlling the one to be lowered into an operating position, will now be described.

Secured to each marker arm member 18 is a marker chain retainer in the form of a clip 181 having a slot 182 formed therein. The portion of each clip 181 at each side of the slot, which extends to one edge of the clip, is apertured to receive a pair of bolts 183 that fix the clip 181 to the marker arm channel 18. The slot 182 is adapted to receive a link of a raising chain, indicated in its entirety by the reference numeral 185, and the clip and slot are so dimensioned that when the clip is passed over one of the links of the chain and then connected, as by the bolts 183, to the marker arm channel 18, the associated lifting chain 185 is securely connected to the channel 18. Any adjustment that may be necessary in the effective length of the marker arm lifting chain 185 may be made by disconnecting one or both of the clips 181 and engaging it with a different link of the chain. It will be noted, particularly from Fig. 1, that the lower end of each marker arm channel 18 is formed with an inwardly extending bent portion 187, the end of which is flattened and apertured to receive the stud 17. It will also be noted that the bent portion enables the channel 18 to clear the check fork supporting bar 25 when the marker arm is raised. In other words, when the marker arm is raised into a substantially vertical position, the associated pivot stud 17 lies in a position laterally inwardly of the main portion of the marker arm. Thus, when associated retaining means is released, the raised marker arm moves downwardly immediately, under the influence of gravity, but in the raised position of the marker arms, the latter are disposed vertically in relatively closely associated relation with the ends of the planter frame.

The marker arm chain 185 preferably is so constructed and arranged as to extend from one side to the other of the implement and for the major portion of its length the chain 185 lies within the sill pipe member 11. The central portion of the chain, as best shown in Figs. 1 and 3, is indicated by the reference numeral 185a and is formed into a bight section 185b (Fig. 3) that passes around a sheave 188 that is supported for rotation on a guide member 189, preferably formed as a casting having an open upper portion closed by a cover 191, the guide member 189 being fixed, as by a bolt 192, to the rear end of a bar 195 (Fig. 3) that is connected through the pivot 157 with the upper end of the power operated lever 151. The rear portion of the bar 195 extends through a supporting loop 196 that is fixed to the central frame member 165. The guide 189 is retained in position relative to the bar 195 by means of a pair of lugs 197 that lie on opposite sides of the bar 195. From the bight portion 185b, the chain is passed around a pair of sheaves 198 that are supported on the frame member 165 by suitable pivot means 199, and from the sheaves 198, the chain 195 extends laterally outwardly through the sill pipe member 11, each end of the chain 185 extending outwardly of the associated pipe member through a chain guide casting 201. Each of the latter members includes a downward extension 202 that is fastened to the associated end section 12 by bolt means 203. The latter also serves as means fixing a cam-like snubber member 204 to the planter frame. The action of the snubber member 204 will be described below. As will best be seen from Fig. 3, the sheaves 198 are so mounted that the forward portions of them are disposed substantially in line with the longitudinal axis of the associated sill pipe 11 of which the sleeve-like yoke 165 serves as a part, as best shown in Fig. 3.

As so far described, it will readily be seen that whenever the power unit 135 is actuated to swing the wheel frame downwardly, or clockwise as viewed in Fig. 2, the bar 195 is thrust rearwardly, which elongates the bight portion 185b of the chain 185, thus pulling upwardly against the lowered marker arm, or pulling both of them if both should be in their lowered position. When the wheel frame is raised so as to lower the planting and fertilizing furrow openers and associated distributing mechanism, the bar 195 is moved forwardly and the chain 185 is loosened so as to free one or the other of the markers to be lowered. The means controlling the marker arm to be lowered will now be described.

Figure 4:
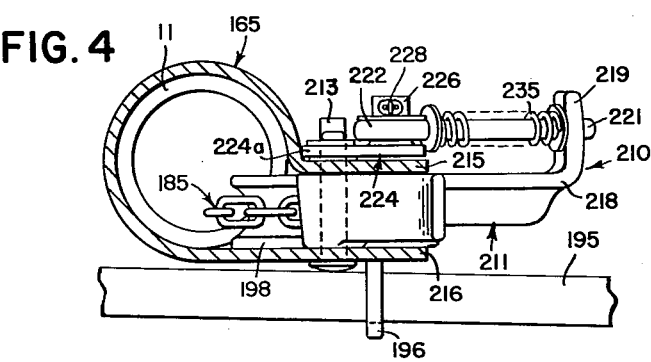
Fig. 4 is a sectional view taken generally along the line 4—4 of Fig. 3.
Figure 5:
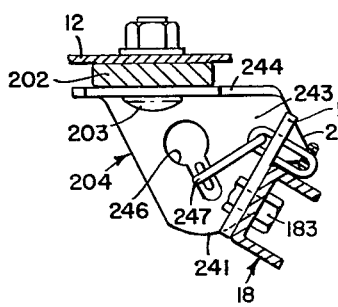
Fig. 5 is an enlarged detail view of the marker arm lockup means.

Referring now to Figs. 3 and 4, the marker arm to be held in raised position while the other is to be lowered is adapted to be retained in elevated position by latch means indicated in its entirety by the reference numeral 210. The latch means 210 includes a dual latching member 211 having two chain-engaging detents 212 and swingably mounted, as by pivot means 213 carried by the upper and lower portions 215 and 216 of the center frame yoke member 165. The member 211 includes a tail section 218 that is provided with an upwardly extending portion 219 that is apertured to slidably receive the rear portion of a rod member 221. The forward end of the rod 221 is formed with an eye 222 that pivotally connects the rod member 221 with a link member 224 that is mounted for laterally swinging movement on the pivot 213, which is extended upwardly for this purpose. The laterally swingable link 224 includes an upwardly extending section 226 that not only pivotally receives the eye 222 of the rod 221 but also is apertured or otherwise formed or constructed to receive the inner end of a pair of turn control chain sections, each indicated by the reference numeral 228. Preferably, the sections 228 are parts of a single length of chain threaded through an opening in the pivot 226 and is held by pins or the like against displacement relative thereto. At their rear or laterally inwardly disposed ends, the chain sections 228 extend laterally outwardly and then pass through curved guide pipes 231 that pass through and are welded to the adjacent portions of the upper sill pipe member 11. From the forward ends of the guide pipes 231, the latch controlling chains 228 extend forwardly alongside the plate members 33 of the draft frame 31 and at their forward ends are connected to a turn bar 233 shown fragmentarily in Fig. 3. This turn bar is adapted to be connected more or less rigidly to the drawbar 234 of the tractor so that when the tractor turns in one direction or the other, one or the other of the chains 228 is pulled forwardly whereby the position of the laterally swingable link 224 is reversed. The link 224 includes abutment sections 224a and 224b that alternately stop against the adjacent portion of the central sleeve section 165 of the frame 10. A spring 235 is mounted on the rod 221 and is confined between an abutment 236 on the rod and the upturned portion 219 of the marker latch member 211. Thus, when the link 224 is swung from one side to the other, the latch member 211 is shifted from one position to the other and so releases the chain portion that extends to one marker arm and locks the other chain portion, acting against the chain and against the associated sheave, 198 or 199. The marker control mechanism 210 just described acts positively to latch one or the other of the marker arms in a raised position, the marker arm that is released being free to swing downwardly whenever the bar 195 is shifted forwardly, which relaxes the chain 185, and the planter lowered into operating position. Whenever the planter is raised into a transport position, the bar 195 is moved rearwardly and the lowered marker arm is raised.

It has been found under certain conditions, as where the planter is transported considerable distances or over rough ground or the like, that the markers in their raised positions are subjected to objectionable amounts of fore-and-aft oscillation. For example, looking at Fig. 1, the rod members 171, being strong in tension, effectively prevent any undesirable rearward oscillation of the channel members 18, but the rod members 171 being relatively weak so far as resisting compressive forces is concerned, are thereby generally inadequate to resist forward oscillation of the marker arms 18 when traveling over excessively rough ground. Accordingly, the present invention contemplates the provision of marker arm snubber bracket means 204, mentioned briefly above, so constructed and arranged that when the marker arms are raised, the channel members 18 engage the snubber brackets 204 so that the latter acts to prevent undesired forward oscillation of the arms 18 in their raised positions. To this end, each of the snubber brackets 204 is formed with a generally rearwardly facing cam section 241 and an associated stop section 242, the sections being formed on the generally horizontal portion 243 of the bracket 204. The latter includes a generally vertical section 244 that is apertured to receive the associated fastener 203. Thus, whenever the marker arms are raised, the channel sections 18 are disposed in a position immediately behind and substantially in contact with the abutment sections 241 and 242 so that the brackets 204 prevent any undesired forward movement of the marker arm units.

In some instances it may be desirable to provide means for locking the marker arms in their raised positions independently of the associated raising bar 195 and associated latch means 210. To this end, we provide a keyhole slot 246 in each of the snubber brackets 204, the larger portion of the slot 246 being of sufficient diameter to receive the depending end 247 of the associated chain 185. Thus, whenever the marker arms, or either of them, are held in raised position by the chain 185, the depending end portion 247 may be dropped down through the slotted opening 246 and then shifted into the narrow portion 247 thereof, whereby the associated marker arm is held in raised position, and if necessary, the planter lowered, as into an operating position, without entailing the lowering of one or the other of the marker arms.

Reference was made above to the fact that, in each marker arm unit 170, the bar 176 is telescopically associated with the channel member 18. The bar 176 preferably is held in different positions of adjustment, as may be required for different row spacings, by means of a set screw 251 that is threaded into each of the collars 172 and can be positively engaged with the associated bar 176 to prevent displacement of the latter and the associated channel 18. In order to provide for accurate adjustment of the bars 176 relative to the associated channels 18, the latter are apertured, as at 252, to provide a plurality of spaced index means with which an aperture 253 in the bar 176 (Fig. 6) may be brought into alignment. This provides visual means by which accurate adjustment of the marker arm bar 176 may be secured.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a planter, a frame including a generally transverse pipe member having an opening therein facing in a generally fore and aft extending direction, a pair of marker arms swingably connected with the ends, respectively, of said transverse member, for generally lateral movement relative to the planter frame, a flexible element extending along the inside of said pipe member and out through the ends of the pipe member and connected with said marker arms, said flexible element having a generally central bight portion extending outwardly through said opening to a point outside said pipe member, a fore and aft shiftable bar extending across said pipe member, means supporting one end portion of said bar on said pipe member adjacent said opening, sheaves carried by said pipe member at each side of said bar and extending partially into the latter to guide said flexible element, a lever pivoted on said frame and operatively connected with the other end of said bar for shifting the latter transversely of said pipe member, and a sheave on said one end of said bar to receive and support said bight portion.

2. In a planter, a frame including a transverse pipe member including a pair of axially spaced apart pipe sections and a central sleeve-like member U-shaped in section and embracing and fixed to the adjacent ends of said pipe sections, said sleeve-like member having rearwardly directed vertically spaced apart extensions a pair of marker chain receiving sheaves journaled for rotation on said sleeve-like member and mounted between said extensions so as to dispose a portion of each sheave in the line with the interior of said pipe member, and a marker-operating chain passing over said sheaves and extending along the inside of said pipe sections.

3. The invention set forth in claim 2, further characterized by an operating part movable generally transversely of and supported partially on said central member, said chain including a bight portion between said sheaves, and a third sheave receiving said bight portion and carried by said operating part.

4. The invention set forth in claim 2, further characterized by a part movably disposed between said vertically spaced apart extensions and engageable optionally with portions of said chain overlying one or the other of said sheaves for locking one or the other of said marker arms in a raised position.

5. The invention set forth in claim 2, further characterized by a chain-engaging latch swingable between said spaced apart extensions and lockingly engageable with the chain on one or the other of said sheaves, optionally, spring-biased means connected with said latch and acting at one end against the latch to releasably hold said latch in either of the positions, a pair of curved guide tubes carried by and extending transversely of said pipe member, and latch controlling flexible elements extending through said guide tubes and connected with said spring-biased means to shift said other end thereof so as to change the position of said latch.

6. In a planter, a generally transverse main frame, a wheel frame swingably connected with the main frame for movement relative thereto about a transverse axis, said wheel frame including wheel-carrying arms, whereby swinging of said wheel frame acts to raise and lower the main frame, marker arms pivoted to the end portions of said main frame, a lever pivoted at a midpoint on the main frame for movement relative thereto, means connecting one end of the lever with the wheel frame to swing the latter, and means connecting the other end of the lever with said marker arms to raise the latter when the wheels are lowered.

7. In a planter, a generally transverse main frame, a wheel frame swingably connected with said main frame and including ground wheels for supporting the main frame, a lever pivotally mounted at a generally intermediate point on the main frame and connected at one end with said wheel frame to rock the latter, a generally fore-and-aft extending rigid bar pivotally connected at one end to the other end of said lever, a sheave on the other end of said rigid bar, a pair of sheaves mounted on said frame generally at opposite sides of said rigid bar, marker arms movably connected with the end portions of said main frame, and a marker arm lifting chain connected at its ends with said marker arms and extending laterally inwardly and trained over said one sheave and said pair of sheaves whereby when said lever is actuated to lower said wheel frame said rigid bar is shifted in a direction to exert a pull on said chain and raise one or both of said marker arms.

8. In a planter, a generally transverse main frame including upper and lower transverse members and generally vertical end and intermediate members rigidly connecting said upper and lower members, draft frame means including a pair of generally vertical laterally spaced apart members fixed at their rear ends to certain of said intermediate members, a wheel frame swingably connected with said intermediate members for movement relative to the main frame about a transverse axis, said wheel frame including wheel-carrying arms, whereby swinging of said wheel frame acts to raise and lower the main frame, marker arms pivoted to the lower portions of said end members, a lever pivoted at a midpoint on and disposed between the laterally spaced apart draft frame members, means connecting one end of the lever with the wheel frame to swing the latter, and means connecting the other end of the lever with said marker arms to raise the latter when the wheels are lowered, including a fore and aft movable bar pivoted at its forward end with the other end of said lever and operatively connected at its rear end with said marker arms.

9. The invention set forth in claim 8, further characterized by means to operate said lever, including a detachable power unit, and means optionally interconnecting the wheel frame and main frame to hold said wheel frame and marker arms in a transport position accommodating removal of said detachable power unit.

10. In a marker control mechanism, a pair of vertically spaced apart frame sections, a pair of chain-receiving sheaves journaled therebetween, a chain-engaging latch pivotally mounted adjacent one end in a position between and supported on at least one of said frame sections, said latch carrying means lockingly engageable with the chain on one or the other of said sheaves, optionally, one end of said latch extending to a point outwardly of and above said frame sections, spring biased means including a link pivoted to the upper frame section and swingable across said latch, and compressible spring means acting between the outer end of said link and the other end of the latch to releasably hold said latch in either of its positions, and means connected with said pivoted link for shifting the latter so as to change the position of said latch.

11. The invention set forth in claim 10, further characterized by pivot means swingably connecting said latch with said spaced apart sections and extending outwardly of the upper of said sections, said link being mounted on the extended portion of said pivot means above said upper section.

12. In a planter, a frame including a transverse pipe member, means providing for access to the interior of said pipe member generally centrally thereof, a pair of marker chain receiving sheaves, means rotatably supporting said sheaves in a position with portions extending into the interior of said pipe member, a pair of marker arms pivotally connected with and swingable toward and away from the outer ends of said pipe member, and a marker-operating chain passing over said sheaves and extending along the inside of said pipe member.

13. The invention set forth in claim 12, further characterized by said chain having a central bight portion extending outwardly from said sheaves, a bar movable transversely of said pipe member and having means at one end to receive said bight portion, and supporting means carried by the pipe member and slidably receiving said bar.

14. In a planter, a generally transverse main frame, a wheel frame swingably connected with said main frame and including ground wheels for supporting the main frame, a lever pivotally mounted on the main frame and connected with said wheel frame to rock the latter, a generally fore-and-aft extending rigid bar operatively connected with said lever to be shifted in a fore and aft direction by movement of said lever, a sheave on said rigid bar, a pair of sheaves mounted on said frame generally at opposite sides of said rigid bar, marker arms movably connected with the end portions of said main frame, and a marker arm lifting chain connected at its ends with said marker arms and extending laterally inwardly and trained over said one sheave and said pair of sheaves whereby when said lever is actuated to lower said wheel frame said rigid bar is shifted in a direction to exert a pull on said chain and raise one or both of said marker arms.

15. The invention set forth in claim 14, further characterized by means to operate said lever, including a detachable power unit, and means optionally interconnecting said lever and said main frame for locking the wheel frame in a transport position to accommodate removal of the detachable power unit.

16. In a planter, a generally transverse main frame including upper and lower transverse members and generally vertical end and intermediate members rigidly connecting said upper and lower members, draft frame means fixed to certain of said intermediate members, a wheel frame swingably connected with certain of said intermediate members for movement relative to the main frame about a transverse axis, said wheel frame including wheel-carrying arms, whereby swinging of said wheel frame acts to raise and lower the main frame, marker arms pivoted to the lower portions of said end members, a lever pivoted on said draft frame means, means connecting one portion of the lever with the wheel frame to swing the latter, and means connecting another portion of the lever with said marker arms to raise the latter when the wheels are lowered, including a fore and aft movable bar pivoted at its forward end with said lever and operatively connected at its rear end with said marker arms.

References Cited in the file of this patent
UNITED STATES PATENTS

| | | |
|---|---|---|
| 404,057 | Smith | May 28, 1889 |
| 558,578 | Stewart | Apr. 21, 1896 |
| 960,444 | Tucker | June 7, 1910 |
| 1,021,021 | Vibbert | Mar. 26, 1912 |
| 1,911,218 | White | May 30, 1933 |
| 2,063,852 | Ray | Dec. 8, 1936 |
| 2,081,939 | Tourneau | June 1, 1937 |
| 2,338,632 | Frazier | Jan. 4, 1944 |
| 2,546,412 | White | Mar. 27, 1951 |
| 2,585,992 | Bjerkan | Feb. 19, 1952 |
| 2,604,027 | Hansen | July 22, 1952 |
| 2,657,623 | Allen | Nov. 3, 1953 |
| 2,748,686 | Nelson | June 5, 1956 |